(12) United States Patent
Bois et al.

(10) Patent No.: US 6,240,835 B1
(45) Date of Patent: Jun. 5, 2001

(54) ELECTRIC COOKING APPLIANCE IN PARTICULAR DEEP FRYER

(75) Inventors: Bernard Marcel Bois, Caen; Sylvain Giffard, Cambes en Plaine; Romain Sibarita, Petiville, all of (FR)

(73) Assignee: Moulinex S.A., Cormelles le Royal (FR)

( * ) Notice: Subject to any disclaimer, the term of this patent is extended or adjusted under 35 U.S.C. 154(b) by 0 days.

(21) Appl. No.: 09/622,977

(22) PCT Filed: Feb. 23, 1999

(86) PCT No.: PCT/FR99/00426

§ 371 Date: Oct. 12, 2000

§ 102(e) Date: Oct. 12, 2000

(87) PCT Pub. No.: WO99/43245

PCT Pub. Date: Sep. 2, 1999

(30) Foreign Application Priority Data

Feb. 25, 1998 (FR) .................................................. 98 02871

(51) Int. Cl.[7] .................................................. A47J 37/12
(52) U.S. Cl. ........................... 99/330; 099/337; 099/336; 099/403; 099/407
(58) Field of Search .................................. 099/326–333, 099/337, 338, 336, 403–410, 353–355; 126/391, 369; 219/492, 494, 489, 497, 441, 435–439, 421, 422, 425, 427, 442, 523; 165/163; 210/167, 187, DIG. 8; 426/231, 438

(56) References Cited

U.S. PATENT DOCUMENTS 3,839,951 * 10/1974 Palmason ............................... 99/330
5,740,721 * 4/1998 Bizard ................................... 99/337

FOREIGN PATENT DOCUMENTS

| 598 794 | 5/1978 | (CH) . |
| 0 341 606 | 11/1989 | (EP) . |
| 2 724 835 | 3/1996 | (FR) . |
| WO 96/05761 | 2/1996 | (WO) . |

* cited by examiner

Primary Examiner—Timothy F. Simone
(74) Attorney, Agent, or Firm—Young & Thompson

(57) ABSTRACT

An electric cooking appliance includes an external housing with a fixed or removable vat for cooking food and an electrical heater arranged under the vat and in thermal relationship with the vat. The appliance has a sensor for detecting a substantially vertical deformation of the vat base occurring while the appliance is operating, and for opening the electric power circuit of the heater when the detected deformation reaches a predetermined threshold corresponding to a substantially empty vat.

9 Claims, 4 Drawing Sheets

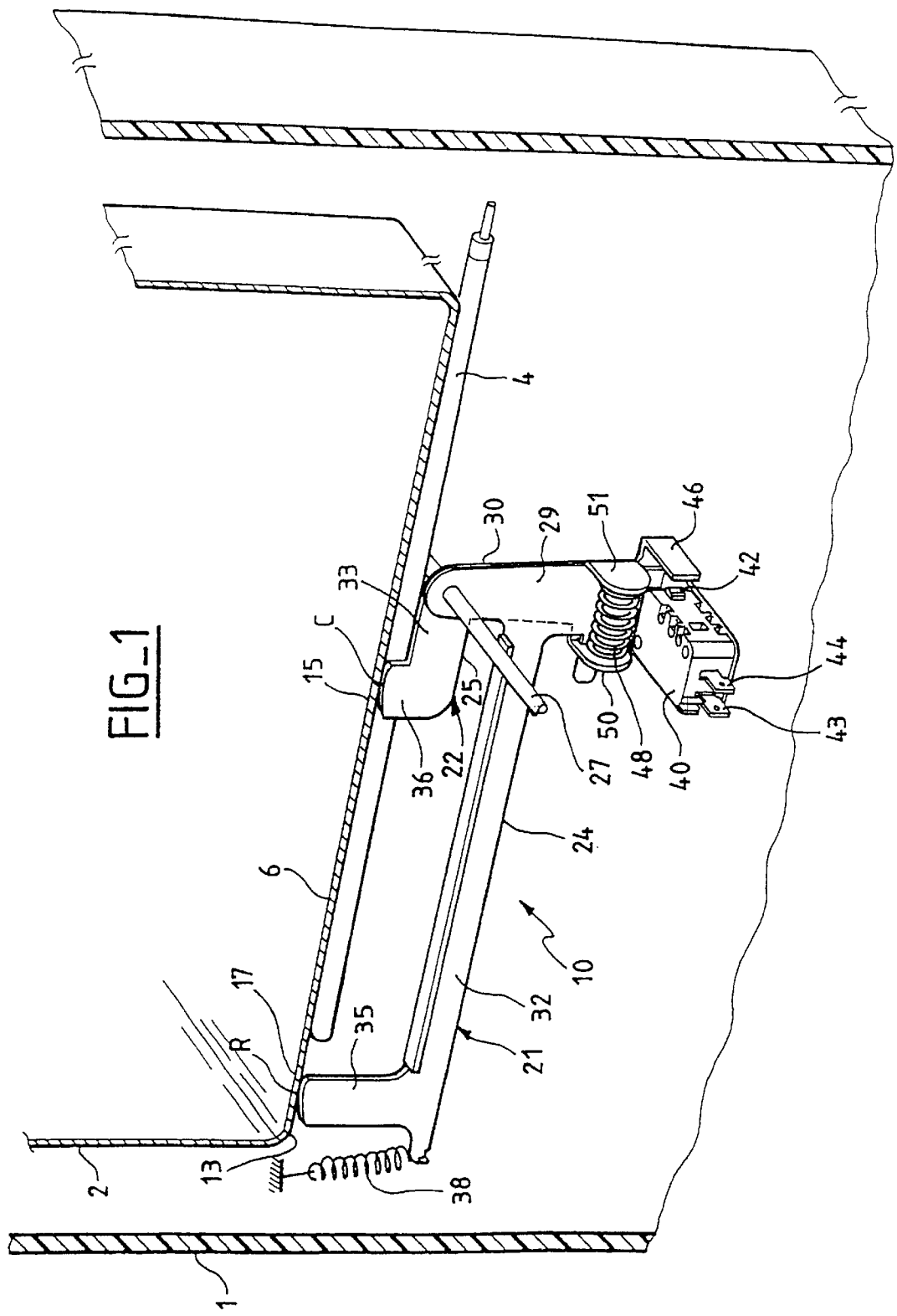
FIG_1

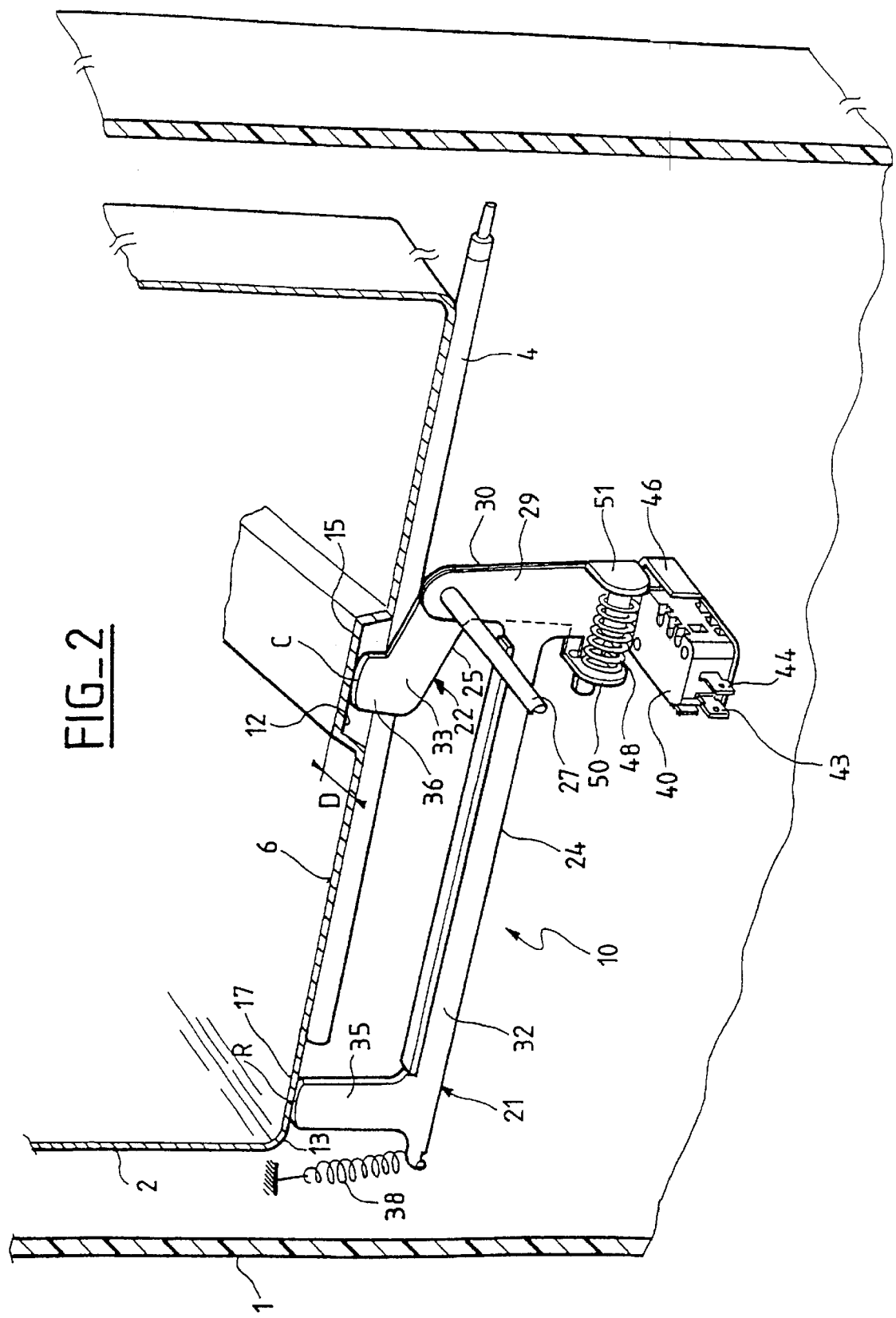

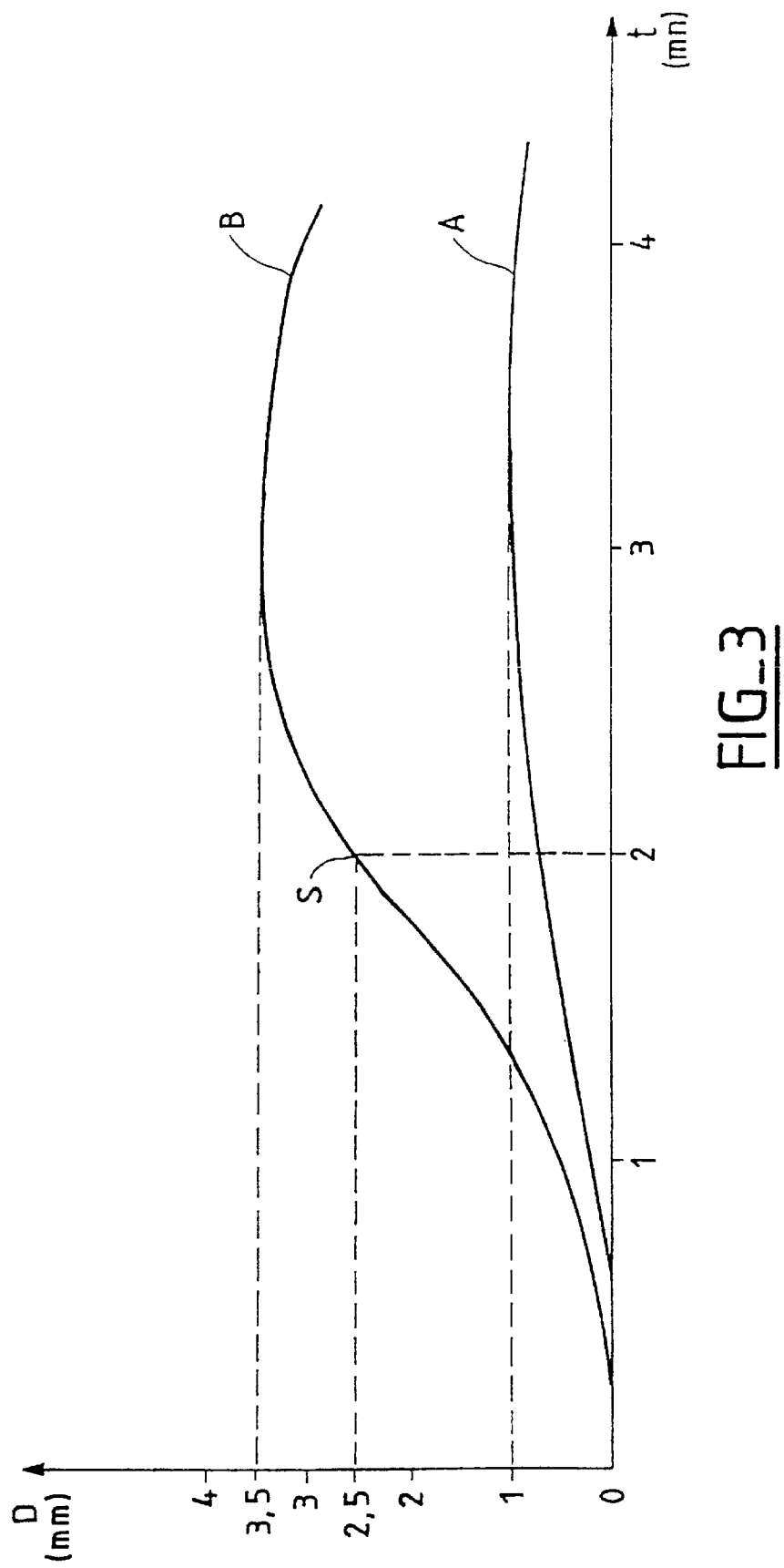
FIG_3

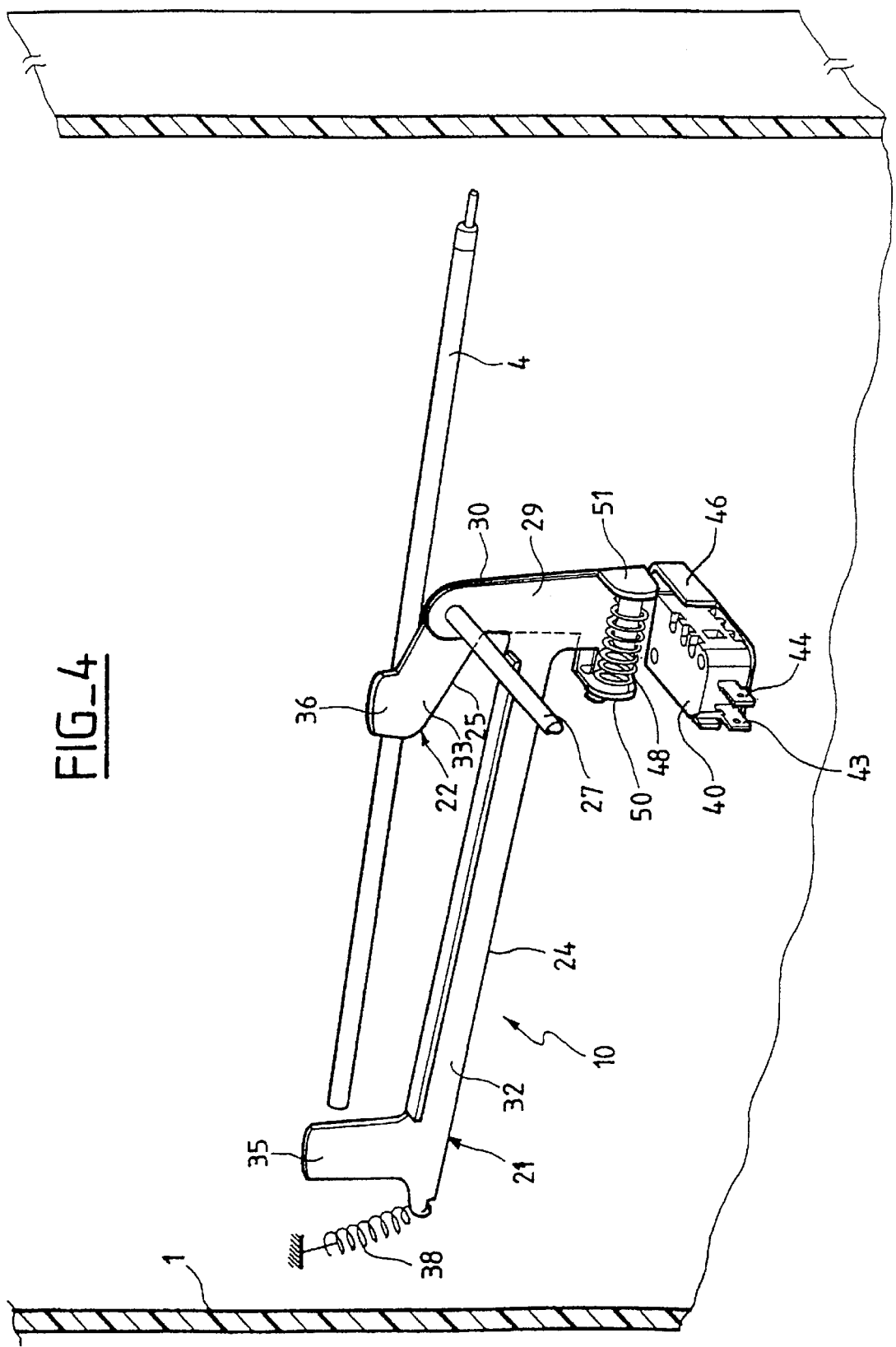
FIG_4

ELECTRIC COOKING APPLIANCE IN PARTICULAR DEEP FRYER

The present invention relates to electric cooking apparatus, particularly but not exclusively to electric deep fryers adapted for cooking, particularly in an oil bath, of foodstuffs such as fried potatoes, fish or meat, and comprising an external housing in which are incorporated a metallic vat, fixed or removable, and electric heating means disposed below the vat and in heat exchange relation with this latter.

BACKGROUND OF THE INVENTION

During the use of such a cooking apparatus, for example a deep fryer, there always exists the risk that the user will forget to refill the vat with oil and will start the frying operation, thus rapidly leading to damage to the vat, such as, for example, cracking or sublimation of the coating which is generally used to facilitate the cleaning of the vat and which internally and externally covers this latter, even to ignition of the deep fryer due to the presence of a film of residual oil on the internal walls of the vat.

To overcome these drawbacks, and hence to ensure the safety of the user and to avoid any damage to the apparatus, it has been proposed to provide such a cooking apparatus with a safety device permitting preventing activation of the electric heating means when the vat, present in the housing, is empty of oil or does not contain sufficient oil. A known safety device uses a temperature detector which reacts to the temperature of the heating means, so as to cut off the electrical supply to the latter when the detected temperature of the heating means exceeds a predetermined maximum temperature corresponding to a vat empty of oil or insufficiently filled with oil. However, to perform correctly its temperature detection function, such a detector must be highly precise and highly reliable, given the high heating powers associated with cooking apparatus, which is difficult to obtain and relatively cumbersome.

SUMMARY OF THE INVENTION

The invention has particularly for its object to overcome these drawbacks and to provide in a simple and less costly way an electric cooking apparatus, of the type described above, which has a high safety of operation as to any risk connected with the absence of oil or a too small quantity of oil in the vat.

According to the invention, the apparatus comprises detection means adapted on the one hand to detect a substantially vertical deformation of the bottom of the vat that takes place during operation of the apparatus, under the influence of heat produced by the heating means, and on the other hand to open the electrical supply circuit of the heating means when the detected deformation reaches a predetermined threshold corresponding to a substantially empty vat.

Thus, the invention takes advantage of the vertical deformation to which the bottom of the vat is subject during heating action produced below the vat, rapidly to cut off the heating if the vat is empty of oil or insufficiently filled with oil, thereby giving optimum guarantee of safety to the user; this vertical deformation of the bottom of the vat taking place in a sufficiently reproducible manner to be able to use it as a parameter for the total or almost total absence of oil in the vat.

According to another important characteristic of the invention, the detection means are adapted to detect the relative deformation of the bottom of the vat that takes place in the central region of the vat, relative to a so-called reference region of the vat which is located substantially on the external border of the base of the vat, and in which the bottom of the vat, during operation of the apparatus, is subject to almost no deformation. Thus, the substantially thermally undeformable region of the vat itself constitutes preferably a true reference, and the only one needed, to permit analyzing with precision the deformation of the vat, thereby making it unnecessary to take into account all the other areas of the construction of the apparatus.

According to a preferred embodiment of the invention, the deformation of the bottom of the vat taking place internally of the vat, the detection means comprise a system of two detection members, namely a first detection member which is in contact with the external surface of the bottom of the vat, at a so-called zero reference point located in the reference region of the vat, and a second detection member which is in contact with the external surface of the bottom of the vat, at the center of this latter, so as to detect the relative deformation of the bottom of the vat with respect to the zero reference point, and which is movable between a first position in which the detected relative deformation of the bottom of the vat reaches a level below the predetermined threshold, this level corresponding to a sufficiently filled vat, and in which it controls the closing of the electrical supply circuit of the heating means, at a second position in which the detected relative position of the bottom of the vat reaches the predetermined threshold corresponding to a substantially empty vat and in which it controls the opening of the electrical supply circuit of the heating means.

In this embodiment of the invention, and in the case of a removable vat, the second movable detection member is also adapted to occupy a rest position in which the movable vat is absent from the housing and in which it controls the opening of the electrical supply circuit of the heating means, this second detection member thus constituting a means adapted to detect whether the removable vat is present or absent in the housing, and also, when the removable vat is present, to detect whether the vat is sufficiently filled or is substantially empty. Thus, this second detector member constitutes itself a simple mechanical member, less costly, and which, moreover, preferably fulfills the double function of detection of the presence of the vat and of the filling of the vat to a sufficient level with oil.

BRIEF DESCRIPTION OF THE DRAWINGS

The characteristics and advantages of the invention will become further apparent from the description which follows, by way of non-limiting example, with reference to the accompanying drawings, in which:

FIG. 1 is a fragmentary schematic perspective view and in vertical cross-section, of a cooking apparatus such as a deep fryer, according to the invention, comprising a vat associated with detection means shown in normal operation of the deep fryer;

FIG. 2 is a view similar to FIG. 1, showing a deformation of the bottom of the vat when the latter is empty of oil;

FIG. 3 shows as a function of time (in minutes) the deformation (in millimeters) of the bottom of the vat when the latter is sufficiently filled with oil and empty of oil; and FIG. 4 is a view similar to FIG. 1, in the absence of the removable vat.

DESCRIPTION OF THE PREFERRED EMBODIMENTS

In the embodiment shown in FIG. 1, the electric deep fryer adapted for cooking foodstuffs by immersion particularly in a bath of oil, comprises, in an external housing 1, a metallic vat 2 that is fixed or removable, for example of rectangular shape, adapted to contain the oil bath for cooking foodstuffs, as well as electrical heating means, such as a shielded heating resistance 4 which is disposed below the vat 2 and in heat exchange relation with this latter to ensure heating by conduction and/or radiation of the vat 2.

Preferably, the vat 2 is made by stamping sheet metal, for example steel, and is then covered internally and externally with a heat-resistant coating, for example of enamel, which permits facilitating cleaning of the vat and avoiding adherence of foodstuffs to the internal surface of the vat.

In the embodiment shown in FIG. 1, the vat 2 has a flat bottom 6 below which is in direct contact the heating resistance 4, which is flat and preferably has the shape of a serpentine adapted to promote its thermal contact over all the length and all the width of the bottom 6 of the vat 2, which is rectangular in this example. Preferably, a thermal reflector (not shown) is arranged below the shielded heating resistance 4, such that in operation, in this example, the shielded resistance 4 ensures heating of the vat 2 both by conduction and by radiation after reflection from the reflector.

According to the invention, the electric deep fryer moreover comprises detection means, designated by overall reference numeral 10 in FIGS. 1, 2 and 4, which is adapted, on the one hand, to detect a substantially vertical deformation of the bottom 6 of the vat 2 that takes place during operation of the fryer, under the influence of the heat produced by the heating resistance 4, and on the other hand, to open the electrical supply circuit of the heating resistance 4 when the detected deformation reaches a predetermined threshold corresponding to a vat 2 that is substantially empty of oil.

Because the vertical deformation of the bottom 6 of the vat takes place in a sufficiently reproducible manner to be able to use it as a parameter for the total or almost total absence of oil in the vat 2, the means 10 for detecting this deformation preferably constitutes safety means for the operation of the deep fryer.

Moreover, as a result of tests carried out by the applicant, it has been determined that in empty operation of the fryer, the heating of the shielded resistance 4 gives rise to substantial deformation of the bottom 6 of the metallic vat 2 in the central region of this latter, and in a preferential direction due to the stamping of the vat 2 and which is directed toward the interior of the vat, as shown on an enlarged scale at 12 in FIG. 2, whilst the region of the vat located substantially along the external border 13 of the bottom 6 of the vat 2 is itself almost not subjected to this deformation.

With reference to FIG. 3, the curve A shows, as a function of the time t the deformation D to which the bottom 6 of the vat 2 is subject, in this instance enameled steel, in the central region of the vat, indicated at 15 in FIG. 1, during normal operation of the deep fryer, which is to say the vat 2 is sufficiently filled with oil. As shown by this curve A, the deformation D of the central region 15 of the bottom 6 of the vat increases in a regular manner to stabilized at a value equal to 1 millimeter in this example. By contrast, during empty operation of this same deep fryer, which is to say the vat 2 is empty of oil or insufficiently filled with oil, as shown by curve B in FIG. 3, the deformation D of the central region 15 of the bottom 6 of the curve increases very rapidly to reach, in approximately 2 minutes, a value equal to 2.5 millimeters as shown on the point S, and then to stabilize at a value equal to 3.5 millimeters in this example.

Thus, preferably, the predetermined threshold of deformation of the bottom 6 of the vat 2 when the latter is empty of oil or insufficiently filled with oil, and for which the detection means are adapted to open the electrical supply circuit of the heating resistance 4, is selected, in this example, to be equal to 2.5 millimeters.

Preferably, the detection means 10, of FIGS. 1 and 2, are adapted to detect the relative deformation of t bottom 6 of the vat 2, in the central region 15 of the latter relative to the region of the vat, a so-called reference region and indicated at 17 in FIGS. 1 and 2, which located on the external border 13 of the bottom 6 of the and which is almost not subject to deformation during operation of the deep fryer. Thus, the fact of taking into account the vat itself as the reference, at the level of its region 17 substantially without deformation, permits analyzing with high precision the deformation of the bottom 6 of the vat during operation of the deep fryer, and hence to be free from any influence of the various elements of the construction of the deep fryer.

According to a preferred embodiment of the invention, the detection means 10 comprise a mechanical system with two detector members 21, 22 comprising respectively a first lever 24 and a second lever 25 which are associated with each other by being mounted swingably about a same fixed axle 27 arranged in the housing 1, and which comprise respectively two vertical uprights 29, 30 applied one against the other by being traversed through their respective upper ends by the axle 27, and having respectively, at two different levels, two transverse parallel arms 32, 33 extending over the width of the vat 2 and having respectively, at their respective free ends, two vertical fingers forming feelers 35, 36 permanently in point contact against the external surface of the bottom 6 of the vat 2, one (35) at a point R which is the so-called zero reference located in the reference region 17 of the vat 2, the other (36) at the center C of the vat, see FIG. 1. The two levers 24, 25 are urged together by a same resilient return member 38, such as a loaded spiral spring of which one end is fixed in the housing 1 and of which the other end is anchored to the free end of the arm 32 of the lever 24.

In this example, the swinging lever 25 is adapted to occupy a first position (FIG. 1) in which the relative deformation detected at the center C of the vat 2 relative to the zero reference point R, during operation of the deep fryer, reaches a level below the predetermined threshold, selected in this example to be equal to 2.5 millimeters, and corresponding therefore to a vat 2 sufficiently filled with oil, and in which it controls a safety switch 40 so as to close the electrical supply circuit of the heating resistance 4, as well as a second position (FIG. 2) reached by greater swinging and in which the detected deformation D of the bottom 6 of the vat 2, at the center C of the vat, relative to the zero reference point R, reaches or exceeds the predetermined threshold, namely 2.5 millimeters in this example, and hence corresponding to a vat 2 empty of oil or insufficiently filled with oil, and in which it controls the switch 40 so as to open the electrical supply circuit of the heating resistance 4.

In this embodiment, the safety switch 40 is for example of the normally closed type and comprises a movable control button 42 (FIG. 1) whose manipulation opens the contacts; this switch 40 has electrical connections 43, 44 adapted to be connected to the electrical supply circuit of the heating resistance 4.

In this example, the vertical upright 30 of the lever 25 is provided at its base with a tongue 46 which, on the one hand, is spaced from the button 42 of the switch 40 so as to permit closure of the electrical supply circuit of the heating resistance 4 when the lever 25 occupies its first position (FIG. 1)

in which the vat 2 is sufficiently filled with oil, and on the other hand, depresses the button 42 of the switch 40 so as to permit opening of the electrical supply circuit of the heating resistance 4 when the lever 25 comes to occupy by swinging its second position (FIG. 2) in which the vat 2 is empty of oil or insufficiently filled with oil.

With respect to FIGS. 1 and 2, a tension spring 48 is interposed, in a direction parallel to that of the two arms 32, 33 of the two levers 24, 25, between two crosspieces 50, 51 formed respectively on the two vertical uprights 29, 30 of the two levers 24, 25, so as to ensure the maintenance of the tongue 46 of the lever 25, either remote from the button 42 of the switch 40 when the lever 25 is in its first position (FIG. 1), or in bearing relationship against the button 42 20 of the switch 40 when the lever 25 is in its second position (FIG. 2).

According to another characteristic of the invention, the vat 2 being removable, the lever 25 is also adapted to occupy by swinging upwardly a rest position (FIG. 4) in which the vat 2 is absent from the housing 1 and in which its tongue 46 comes to bear against the button 42 of the switch 40 so as to permit opening the electrical supply circuit of the heating resistance 4.

Thus, this swinging lever 25 preferably constitutes a simple mechanical member adapted to detect whether the removable vat 2 is present or absent in the housing 1, and similarly, when the removable vat is present, to detect whether the vat 2 is sufficiently filled with oil or empty.

The operation of the detection means 10 according to the invention is the following:

First, let it be supposed that the vat 2 is removable and is absent from the housing 1, the two levers 24, 25 each occupy a rest position shown in FIG. 4 and in which the respective upper ends of their fingers 35, 36 are located in a same horizontal plane and are maintained therein under the action of the correctly loaded return spring 38. In this rest position, the tongue 46 depresses the button 42 of the switch 40, thereby permitting in this example opening the electrical supply circuit of the heating resistance 4; the deep fryer thus cannot operate.

When the user emplaces the vat 2 in the housing 1, or when the vat 2 is fixedly mounted in the housing, the two levers 24, 25 are actuated by the bottom 6 of the vat 2 and swing counterclockwise, against the action of the return spring 38, such that their fingers 35, 36, with their upper end, will always be in contact with the external surface of the bottom 6 of the vat 2, respectively at the zero reference point R and at the center C of the vat. Under the influence of the swinging of the lever 25, the tongue 46 of this latter spaces itself from the button 42 of the switch 40, thereby permitting the closure of the electrical supply circuit of the heating resistance 4, see FIG. 1.

The deep fryer being thus placed in operation, the lever 25, by its detecting finger 36, permanently follows the relative deformation to which the bottom 6 of the vat 2 is subject, at the center C of this latter, relative to a zero reference point R.

If the vat 2 is sufficiently full of oil, the deformation of the bottom 6 of the vat 2 is less than the predetermined threshold, in this instance 2.5 millimeters, and is therefore not sufficient to actuate the switch 40. The two levers 25, 26 thus remain practically each in their first position as illustrated in FIG. 1.

If now the vat 2 is empty or insufficiently filled with oil, the deformation D of the bottom 6 of the vat 2 rapidly reaches the predetermined threshold, namely 2.5 millimeters, as shown in FIG. 2, and the lever 25 thus swings in a clockwise direction to occupy its second position in which its tongue 46 depresses the button 42 of the switch 40, thus permitting opening the electrical supply circuit of the heating resistance 4, as shown in FIG. 2.

It is to be noted that the detection means 10 described above and constituted by mechanical means, can also be constituted by optical or magnetic means permitting determining the presence of the removable vat in the housing, as well as the level of oil filling in the vat, by analysis of the deformation of the bottom of the latter, without departing from the scope of the invention.

What is claimed is:

1. An electric cooking apparatus comprising:
   an external housing;
   a metallic vat having a bottom being inside said housing for cooking foodstuffs; and
   electric heating means facing an external surface of said bottom of said vat and in a heat exchange relation with said vat,
   said heating means having detection means to detect a substantially vertical deformation of said bottom of said vat, said deformation taking place during operation of the apparatus, under an influence of heat produced by said heating means,
   said detection means opening an electrical supply circuit of said heating means when said detected deformation reaches a predetermined threshold, said threshold corresponding to a substantially empty vat.

2. The apparatus according to claim 1, wherein said detection means detect said deformation in a central region of said vat, relative to a reference region of said vat located substantially on an external border of said bottom of said vat,
   said bottom of said vat, during operation of said apparatus, undergoes substantially no deformation in said central region.

3. The apparatus according to claim 2, wherein said deformation takes place towards an interior of said vat, said detection means comprising:
   a first feeler member contacting an external surface of said bottom of said vat at a zero reference point (R) located in said reference region of said vat; and
   a second feeler member contacting said external surface of a bottom of said vat, at a center (C) of said external surface, said second feeler member detecting said deformation of said bottom of said vat relative to said zero reference point (R), said second feeler member being movable between
   a first position in which a detected relative deformation of said bottom of said vat reaches a level below said predetermined threshold, said level corresponding to a sufficiently filled vat, said first position closing said electrical supply circuit, and
   a second position in which said detected relative deformation reaches said predetermined threshold, said second position opening said electrical supply circuit.

4. The apparatus according to claim 3, wherein said vat is removable, said second feeler member occupying a rest position when said vat is removed from said housing, opening said electrical supply circuit, said second feeler member detecting whether said vat is present or absent in said housing,
   when said vat is present, said second feeler member detects whether said vat is sufficiently filled or is substantially empty.

5. The apparatus according to claim 4, wherein said first feeler member has a first lever and said second feeler member has a second lever, said first and second levers being swingably mounted about a fixed axle and urged together by a resilient return member,
- in the absence of said vat in the housing, said first and second levers being retracted by said resilient return member, said second lever occupying a rest position and controlling a switch to open said electrical supply circuit and,
- in the presence of said vat in said housing, said first and said second levers being actuated by said bottom of said vat, against a return force of said resilient member, upper ends of said first and said second levers contact said external surface at said zero reference point (R) and at said center (C) of said vat respectively, said second lever occupying said second position, opening said electrical supply circuit.

6. The apparatus according to claim 5, wherein said switch is a normally closed switch having a movable control button, and
- wherein said second lever has a tongue with a first tongue position for depressing said button when said second lever occupies either said rest position or said second position, and a second tongue position removed from said button when said second lever occupies said first position.

7. The apparatus according to claim 1, wherein said vat is internally and externally coated with a heat resistant coating.

8. The apparatus according to claim 7, wherein said vat is enameled steel.

9. The apparatus according to claim 1, wherein said apparatus is a deep fryer.

* * * * *